United States Patent

Scott, Jr.

[15] 3,652,844

[45] Mar. 28, 1972

[54] LASER PLANT CONTROL

[72] Inventor: Ralph A. Scott, Jr., 2819 Elsmine St., Fairfax, Va. 22030

[22] Filed: Feb. 9, 1970

[21] Appl. No.: 9,779

[52] U.S. Cl. .................................. 240/1, 47/1.43, 331/94.5
[51] Int. Cl. ............................................................. F21
[58] Field of Search ...................... 240/1; 47/1.43; 126/270; 331/94.5; 128/395

[56] References Cited

UNITED STATES PATENTS 3,464,028   8/1969   Moeller ............................... 331/94.5

OTHER PUBLICATIONS

Publication: " Life Sciences" published July 15, 1967 page 2403 paragraph 22760
Publication: " Physics Letters" published Mar. 1, 1966 Vol. 20, number 4
Publication: " The Radio and Electronic Engineer" published December 1969, Vol. 38, No. 6

Primary Examiner—Louis J. Capozi
Attorney—Charles K. Wright, Jr., William G. Gapcynski and Lawrence A. Neureither

[57] ABSTRACT

A method and apparatus for destroying weeds and other obnoxious plants by the selective application of laser energy. The apparatus includes a pulsed laser and a system for dispersing the laser beam to provide adequate coverage of the target area.

9 Claims, 1 Drawing Figure

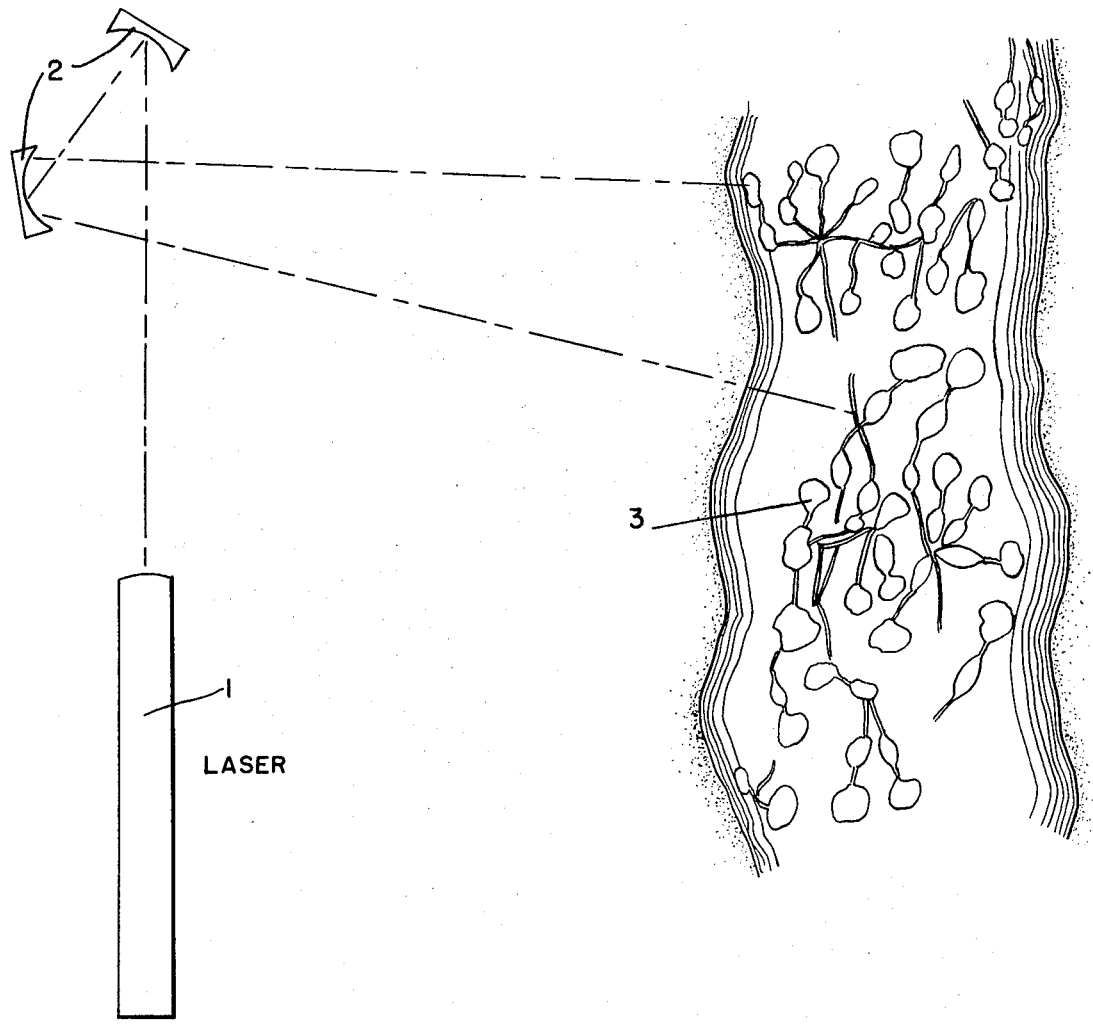

LASER PLANT CONTROL

The invention described herein may be manufactured and used by or for the Government for governmental purposes without the payment to me of any royalty thereon.

BACKGROUND OF THE INVENTION

Mechanical harvesting and chemical agents for plant and weed control are well known and widely used; however, the mechanical means are awkward and cumbersome and the use of chemical agents is accompanied by the threat of air and water pollution with their attendant dangers to human and animal populations.

SUMMARY OF THE INVENTION

The present invention utilizes laser energy for the selective eradication of plant life on land or in water. By selection of the proper level of laser energy weed control may be effected for land plants and aquatic plants at the water surface and below the water surface for suspended and bottom-rooted aquatic plants. Since no chemicals are released into the environment, the problem of air and water pollution is avoided.

Accordingly, it is an object of this invention to provide an apparatus employing laser energy for destroying plant life.

It is another object of this invention to provide a plant control means which does not introduce foreign chemicals into the environment and which may be used without causing pollution of the air or water.

BRIEF DESCRIPTION OF THE DRAWING

The FIGURE is a diagrammatic representation of the invention in use.

DESCRIPTION OF THE PREFERRED EMBODIMENT

Referring to the figure, a laser device 1 generates a laser beam which is directed upon a light dispersing means 2, comprising in this instance an arrangement of mirrors, which diverges the laser beam to a desired degree and directs it upon a target area 3. The diverging mirror arrangement may be formed by two gold colloidal mirrors with mechanical means provided for adjusting the mirror positions to change the size and position of the area irradiated. Although a mirror arrangement is shown, other diverging means would be suitable. It has been found that the selective application of laser energy to plant life causes an immediate wilting of the plant; however, it is a laser irradiation induced interruption of the plant metabolic processes rather than heat-related damage which causes the phytotoxic systemic response.

In operation the laser beam is directed horizontally or vertically over the area in which is located the plant life which is to be destroyed. The type of laser employed, its power output, the length of exposure to laser radiation, and the area of laser irradiation are factors to be determined by the particular application. The distance from the laser energy emission sources to the plants to be eradicated need not be a critical factor. The $N_2$-$CO_2$-He laser system for emerged, floating type plants induces endogenous enzyme system inactivations (transaminases, dehydrogenases, hydrases and transmethylases) required for the synthesis of aminoacids which are essential for biological organism survival. The pulsed copper vapor laser used for submerged weed eradication provides a means to transmit the laser energy through water so the laser energy can inactivate the endogenous synthesis of essential aminoacids by laser energy induced enzyme inactivation.

It has been found that water hyacinths and alligator weed plants can be destroyed using an $N_2$-$CO_2$-He laser operating at 650 watts, an exposure time of as low as 0.25 second, and a beam width of about 1 foot. Wilting occurred almost immediately after irradiation, and death followed about 8 to 12 weeks later. Similar results have been obtained on under water plants such as watermil foil, Elodea, and Hydrilla, using a 5106 Angstrom pulsed copper vapor laser. Since death is caused by an interruption of the plant's metabolic processes, the plant dies in a natural manner similar to death following a sudden freeze and undesirable byproducts produced by unnatural death or decomposition are not present.

The invention may be mounted for use on boats, aircraft, or on land vehicles, and although use on water weeds has been described, the invention could also be used in weed control operations on waterways, along roadsides, in railroad or power line right-of-ways, or home or farm areas.

I claim:

1. A process for controlling emerged type aquatic plant life and land plant life comprising:
   a. providing a 10.6 micron $N_2$-$CO_2$-He laser;
   b. operating said laser at a power output of at least 650 watts; and
   c. irradiating said plant life with coherent radiation from said laser for at least 0.25 second whereby said plant life later dies as a result of interruption of essential metabolic processes in said plant life induced by said laser radiation.

2. The process as defined in claim 1 wherein said plant life consists of water hyacinths.

3. The process as defined in claim 1 wherein said plant life consists of alligator weeds.

4. A process for controlling submerged type aquatic plant life, emerged type aquatic plant life, and land plant life comprising:
   a. providing a 5106 Angstrom copper vapor laser;
   b. operating said laser at a power output of at least 650 watts; and
   c. irradiating said plant life with coherent radiation from said laser for at least 0.25 second whereby said plant life later dies as a result of interruption of essential metabolic processes in said plant life induced by said laser radiation.

5. The process as defined in claim 4 wherein said plant life consists of watermilfoil.

6. The process as defined in claim 4 wherein said plant life consists of Elodea.

7. The process as defined in claim 4 wherein said plant life consists of Hydrilla.

8. The process as defined in claim 4 wherein said plant life consists of water hyacinths.

9. The process as defined in claim 4 wherein said plant life consists of alligator weeds.

* * * * *